(12) United States Patent
Petit

(10) Patent No.: US 6,931,381 B1
(45) Date of Patent: Aug. 16, 2005

(54) METHODS AND APPARATUS FOR AUTHENTICATING THE DOWNLOAD OF INFORMATION ONTO A SMART CARD

(75) Inventor: Frederic Petit, Sandy, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 09/522,628

(22) Filed: Mar. 10, 2000

Related U.S. Application Data

(60) Provisional application No. 60/123,775, filed on Mar. 11, 1999.

(51) Int. Cl.[7] .......................... G06F 17/60; H04K 1/00; H04L 9/00
(52) U.S. Cl. .......................... 705/53; 705/64; 705/68; 705/77; 705/78; 713/178; 713/1; 713/2; 713/100; 717/120; 717/122
(58) Field of Search .............................. 705/53, 64, 68, 705/77, 78; 707/207; 713/1, 2, 100; 717/120, 717/122, 168, 170, 171, 172, 173

(56) References Cited

U.S. PATENT DOCUMENTS

| | | | | |
|---|---|---|---|---|
| 4,882,474 A | * | 11/1989 | Anderl et al. | 235/380 |
| 5,444,861 A | * | 8/1995 | Adamec et al. | 713/100 |
| 5,694,546 A | * | 12/1997 | Reisman | 705/26 |
| 5,912,958 A | * | 6/1999 | Eyran et al. | 379/128 |
| 5,923,884 A | * | 7/1999 | Peyret et al. | 717/167 |
| 5,999,740 A | * | 12/1999 | Rowley | 709/221 |
| 6,058,478 A | * | 5/2000 | Davis | 713/191 |
| 6,105,008 A | * | 8/2000 | Davis et al. | 235/375 |
| 6,164,549 A | * | 12/2000 | Richards | 235/492 |
| 6,173,401 B1 | * | 1/2001 | Deindl et al. | 705/67 |
| 6,219,788 B1 | * | 4/2001 | Flavin et al. | 713/194 |
| 6,256,668 B1 | * | 7/2001 | Slivka et al. | 709/220 |
| 6,317,832 B1 | * | 11/2001 | Everett et al. | 713/172 |
| 6,328,217 B1 | * | 12/2001 | Everett et al. | 235/492 |

(Continued)

FOREIGN PATENT DOCUMENTS

| EP | 000949595 A2 * | 10/1999 | ............. G07F 7/10 |
|---|---|---|---|

(Continued)

OTHER PUBLICATIONS

W. Rankl and W. Effing, "Smart Card Handbook", John Wiley & Sons, p.217-219.*

(Continued)

*Primary Examiner*—James P. Trammell
*Assistant Examiner*—Kambiz Abdi
(74) *Attorney, Agent, or Firm*—Snell & Wilmer L.L.P.

(57) ABSTRACT

Systems and methods for producing a digitally-computed acknowledgment of a delegated download event are disclosed. An information owner, such as the issuer of a smart card, delegates an information download to a third party. The information is downloaded from the third party to an information device, such as a smart card. The computed acknowledgment is a digital "seal" or signature (depending upon the type of cryptographic algorithm used). The seal or signature is preferably a cryptogram generated by the information device using cryptographic keys resident on the information device itself. This acknowledgment is then made available to the information owner, who may then test the cryptogram to determine whether the third party successfully completed the software download.

5 Claims, 3 Drawing Sheets

U.S. PATENT DOCUMENTS

| | | | |
|---|---|---|---|
| 6,347,398 B1 * | 2/2002 | Parthasarathy et al. | 707/203 |
| 6,349,408 B1 * | 2/2002 | Smith | 717/174 |
| 6,390,374 B1 * | 5/2002 | Carper et al. | 235/492 |
| 6,488,211 B1 * | 12/2002 | Everett et al. | 235/492 |
| 6,496,979 B1 * | 12/2002 | Chen et al. | 717/178 |

FOREIGN PATENT DOCUMENTS

| | | |
|---|---|---|
| GB | 2 303 524 A | 2/1997 |
| WO | WO 98/43212 | * 10/1998 |
| WO | WO 98/51037 | 11/1998 |
| WO | WO 00/54208 | * 9/2000 |

OTHER PUBLICATIONS

P. Schnable, "A New High-Security, Multi-Application Smart Card Jointly Developed by Bull and Phillips", 1991, 2nd International Smart Card 2000 Conference, North-Holland, 9-15.*

* cited by examiner

METHODS AND APPARATUS FOR AUTHENTICATING THE DOWNLOAD OF INFORMATION ONTO A SMART CARD

CROSS REFERENCE TO RELATED APPLICATIONS

This application claims the benefit of U.S. Provisional Application No. 60/123,775, filed Mar. 11, 1999.

BACKGROUND OF THE INVENTION

1. Technical Field

The present invention relates, generally, to integrated circuit cards ("smart cards") and, more particularly, to systems for authenticating, via cryptographic techniques, the download of information ("applets") onto a smart card via a trusted third party.

2. Background Information

The term "smart card" refers generally to wallet-sized or smaller cards incorporating a microprocessor or microcontroller to store and manage data within the card. More complex than magnetic-stripe and stored-value cards, smart cards are characterized by sophisticated memory management and security features. A typical smart card includes a microcontroller embedded within the card plastic which is electrically connected to an array of external contacts provided on the card exterior. A smart card microcontroller generally includes an electrically-erasable and programmable read-only memory (EEPROM) for storing user data, random access memory (RAM) for scratch storage, and read only memory (ROM) for storing the card operating system. Relatively simple microcontrollers are adequate to control these functions. Thus, it is not unusual for smart cards to utilize 8-bit, 5 MHZ microcontrollers with about 8K or more of EEPROM memory (for example, the Motorola 6805 or Intel 8051 microcontrollers).

A number of standards have been developed to address general aspects of integrated circuit cards, e.g.: *ISO 7816-1, Part 1: Physical characteristics* (1987); *ISO 7816-2, Part 2: Dimensions and location of the contacts* (1988); *ISO 7816-3, Part 3: Electronic signals and transmission protocols* (1989, Amd. 1 1992, Amd. 2 1994); *ISO 7816-4, Part 4: Inter-industry commands for interchange* (1995); *ISO 7816-5, Part 5: Numbering system and registration procedure for application identifiers* (1994, Amd. 1 1995); *ISO/IEC DIS 7816-6, Inter-industry data elements* (1995); *ISO/IEC WD 7816-7, Part 7: Enhanced inter-industry commands* (1995); and *ISO/IEC WD 7816-8, Part 8: Inter-industry security architecture* (1995). These standards are hereby incorporated by reference. Furthermore, general information regarding magnetic stripe cards and chip cards can be found in a number of standard texts, e.g., Zoreda & Oton, SMART CARDS (1994), and Rankl & Effing, SMART CARD HANDBOOK (1997), the contents of which are hereby incorporated by reference.

Smart cards can contain programming and data to support multiple applications. Some smart cards can be updated to add new applications and/or data after they are issued. Smart card environments have been developed that allow applets to be downloaded onto smart cards by a variety of parties. Accordingly, a typical smart card function set may include a function wherein the smart card issuer (e.g., American Express) may allow an external vendor or other third party to complete the secure download of applets onto the smart card. In such a case, it is important that a trust relationship exists between the issuer and the third party in charge of download. Unfortunately, however, current smart card systems and standards do not provide a guarantee to the issuer that the download from the third party to the smart card was completed successfully. As a result, the third party may, for any number of reasons, fake a download or unintentionally fail to sense a download error.

Thus, a need exists to overcome these and other limitations of the prior art.

BRIEF SUMMARY OF THE INVENTION

In accordance with this invention, a system and method for authenticating the download of information to an information device is provided. In a preferred embodiment of the invention, the information device is a smart card, however, the information device can be virtually any device capable of receiving digital information, for example, a personal digital assistant (PDA) or a cell phone.

In accordance with further aspects of the invention, an information owner (for example, the issuer of a smart card) delegates the information download to a third party.

In accordance with yet another aspect of the invention a digitally-computed acknowledgment of the download event is produced using a digital "seal" or signature (depending upon the type of cryptographic algorithm used). The seal or signature is preferably a cryptogram generated by the information device using cryptographic keys resident on the information device itself. This acknowledgment is then made available to the information owner, who may then test the cryptogram to determine whether the download was successful.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF PREFERRED EXEMPLARY EMBODIMENTS

Systems and methods in accordance with various aspects of the present invention allow an issuer to authenticate the download of software onto a smart card via a trusted third party. More particularly, a signed download system provides a secure method of downloading and verifying the successful download of applications (e.g., "applets") onto a smart card. The term "applet" as used herein is intended to refer to a portable segment of software code. It will be appreciated that applications, applets and/or data can be downloaded to the smart card in accordance with the present invention. It will be appreciated that the invention not only applies to the download of information, but to the updating and deleting of information as well. A variety of software environments may be appropriate in this context, including, for example, the object-oriented Java programming language or a Windows environment. As mentioned above, smart cards are characterized by sophisticated memory management, and security features. For additional information regarding such cards, see, for example, application Ser. No. 09/012,750, filed Jan. 23, 1998, entitled "Methods and Apparatus for a Travel-Related Multi-Function Smart card," which is hereby incorporated by reference. While the invention is ideally suited for downloading information to a smart card, it will be appreciated that the invention is not limited to smart cards as the destination of the downloaded information.

The present invention is described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the various systems described herein are merely exemplary applications for various aspects of the invention. General techniques that are known to those skilled in the art are not described in detail herein.

Figure 1:
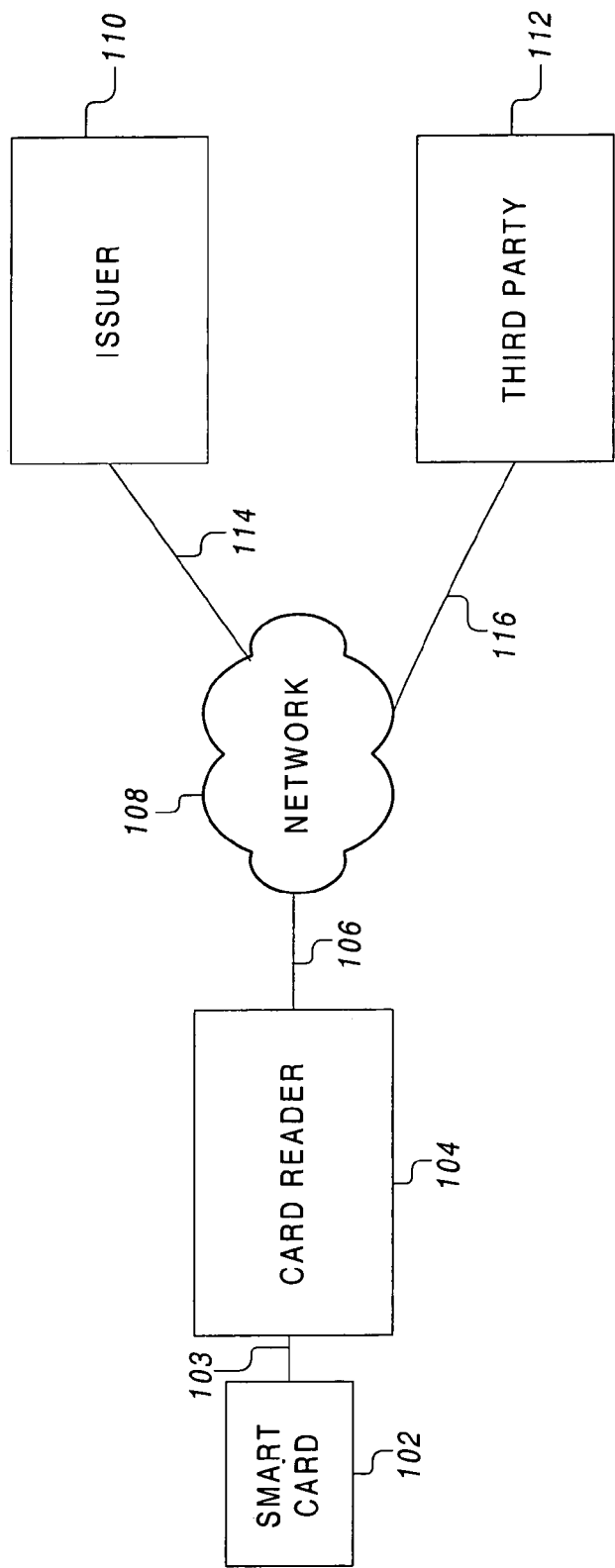
FIG. 1 is a schematic overview of a distributed communication system including a smart card, smart card reader, issuer, and a third party connected over a network.

Referring to FIG. 1, an information owner, for example, an issuer 110 (e.g., a bank card provider, credit card issuer and/or the like) delegates to a third party 112 the task of downloading an applet to a smart card 102, wherein the smart card 102 is suitably interfaced with a smart card reader 104 using a communication protocol 103. The smart card reader 104 is connected to a network 108 via a communication link 106. Issuer 110 and third party 112 are also suitably connected to network 108. It will be appreciated that the issuer can delegate downloads to more than one third party. It will also be appreciated that the various components need not be interconnected via a single network.

Figure 2:
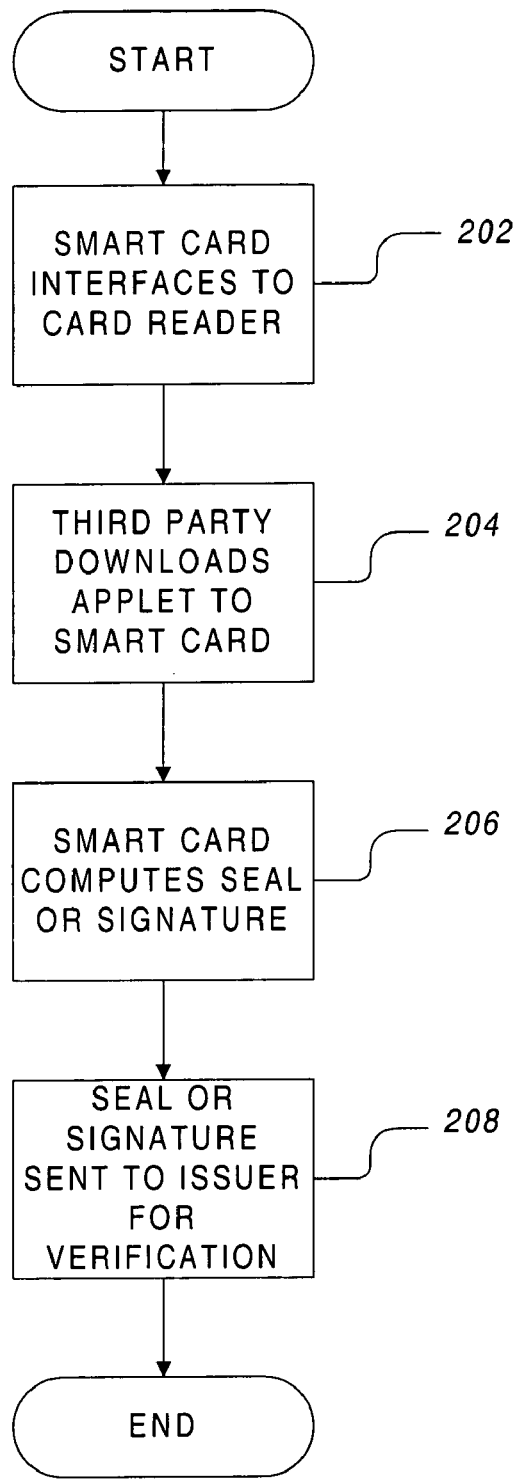
FIG. 2 is a flowchart depicting an exemplary method for computing a digital acknowledgment.

Referring now to FIG. 1 and FIG. 2, in a preferred embodiment, the process is initiated when smart card 102 is inserted into smart card reader 104 and appropriate handshaking and authentication take place (Step 202). In Step 204, third party 112 initiates the download of an applet via network 108 onto smart card 102 (Step 204). This can occur in a variety of ways. For example, the connection between the card and the card reader may have initiated a connection to the issuer. The issuer may have communicated to the card reader that a display be provided which allows a user to select whether or not an application should be downloaded. The user may select the download of the application which triggers the download from the third party. Alternatively, the application may be downloaded without operator intervention. It will be appreciated that the download can be the loading of new information, the updating of existing information or the deletion of existing information. It will also be appreciated that the information to be loaded, updated or deleted can be an application, an applet, data, or a combination thereof. Once the downloading operation is complete, the processor of smart card 102 computes a seal or signature (described below) based upon the downloaded applet (Step 206). The identification of the third party may be used in computing the seal or signature. Finally, in Step 208, the computed seal or signature is suitably transmitted to issuer 110 for verification (Step 208). It should be understood that the exemplary process illustrated may include more or less steps or may be performed in the context of a larger processing scheme. Furthermore, the various flowcharts presented in the drawing figures are not to be construed as limiting the order in which the individual process steps may be performed.

Figure 3:
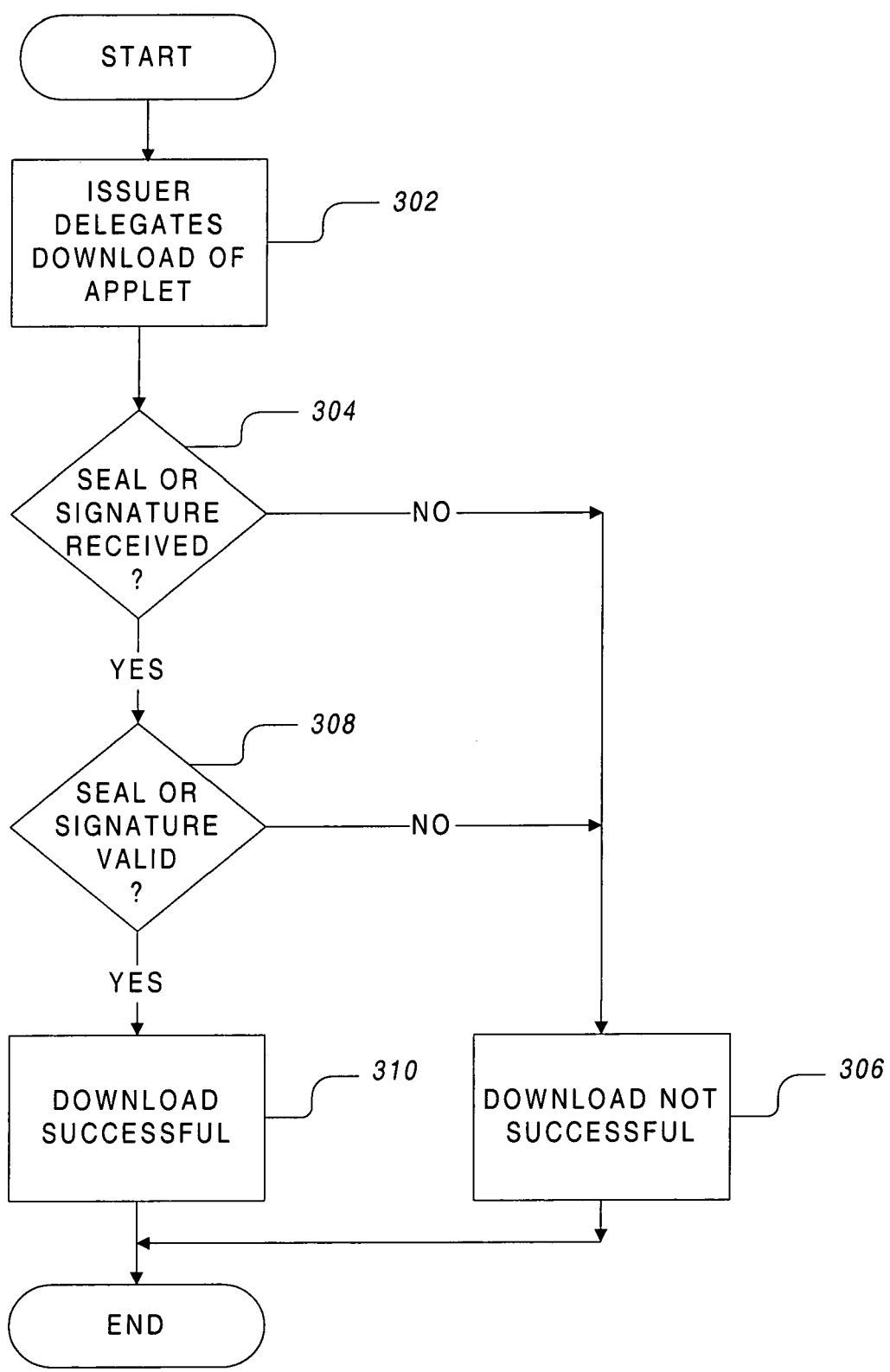
FIG. 3 is a flowchart depicting an exemplary issuer verification procedure.

From the issuer's point of view, referring now to FIG. 3, the seal or signature may be used to verify the download. That is, after the issuer delegates the download of the applet (Step 302), the issuer waits an appropriate amount of time for receipt of a seal or signature (Step 304). The method of delegation varies based on the components involved. For example, the delegation may be a message or the information to be downloaded may be supplied to the third party from the issuer. If no acknowledgment is received within the specified time period, the download is considered unsuccessful (Step 306). In an actual embodiment of the system, the seal or signature can not be computed until after the download takes place. Thus, the acknowledgment provides a notification to the issuer. The issuer can take action based upon the notification, for example by not issuing payment. In other embodiments, the issuer can cause the information to be removed from the card. In yet another embodiment, the authentication takes place upon initiation of the download, but the download does not complete unless a successful authentication occurs. If a seal or signature is received ("Yes" branch from Step 304), the issuer tests the received acknowledgment against an expected result based upon any suitable method, such as, for example, based on a known key (in the case of a symmetrical algorithm) or plurality of keys (in the case of an asymmetrical algorithm) (Step 308). If the seal or signature is suitably verified, the download is considered successful (Step 310). Otherwise, the download is considered unsuccessful (Step 304).

As mentioned above, the present invention produces a digitally-computed acknowledgment of the download event using any known acknowledgment method, such as, for example, a digital "seal" or signature (depending upon the type of cryptographic algorithm used). Those skilled in the art will appreciate that a variety of algorithms may be employed to create this digitally computed acknowledgment. In a preferred embodiment, the seal or signature is preferably a cryptogram generated by the smart card using cryptographic keys resident on the smart card itself.

In an exemplary embodiment, a symmetrical DES algorithm (Data Encryption Standard) is employed based on a key known to both issuer 110 and smart card 102 (for example, a triple-DES algorithm). It will be appreciated, however, that any number of other symmetrical or asymmetrical techniques may be used in the context of the present invention. More particularly, there are two general categories of encryption algorithms: symmetric and asymmetric. Symmetric algorithms use the same key for encryption and decryption, for example, DEA (data encryption algorithm) which uses a 56-bit key to encrypt 64-bit blocks of data. The acknowledgment generated using a symmetric algorithm is a "seal," for example, a message authentication code (MAC). Asymmetric algorithms, in contrast, use two different keys: one secret key and one public key. The acknowledgment resulting from an asymmetric algorithm is a digital signature. The RSA algorithm, for example, uses two such keys and exploits the computational complexity of factoring very large prime numbers. Additional information regarding these and other cryptographic principles can be found in a number of standard texts, such as, for example: Seberry & Pieprzyk, CRYPTOGRAPHY: AN INTRODUCTION TO COMPUTER SECURITY (1989); Rhee, CRYPTOGRAPHY AND SECURE COMMUNICATIONS (1994); Stinson, CRYPTOGRAPHY: THEORY AND PRACTICE (1995); CONTEMPORARY CRYPTOGRAPHY: THE SCI- ENCE OF INFORMATION INTEGRITY (1992); and Schneier, APPLIED CRYPTOGRAPHY (2d ed. 1996), the contents of which are hereby incorporated by reference.

As mentioned above, the present invention is particularly advantageous in the context of so-called smart card environments which allow multiple parties to download applets onto a card. The present invention is not so limited, however, and may also be employed in non-smart card environments, for example, PDAs and cell phones, etc. That is, a signed download may be performed based on transfer of information from an information owner to an information device, wherein the information owner receives a digitally computed acknowledgment from the information device responsive to the download event. Furthermore, the information may delegate the download task to a third party.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention.

What is claimed is:

1. A method for an information owner to download software to an information device over a network, wherein said information device comprises a smart card, and said method comprises the steps of:
   a. the information owner delegating to a third party, download of said software from a server associated with said third party to the information device, wherein said information device is capable of downloading new instruction, update existing instructions, and overwriting existing instructions;
   b. the information device computing an acknowledgment of said download of said software, wherein said acknowledgment includes a digital signature created via public key encryption;
   c. the information device sending said computed acknowledgment to the information owner via said network; and
   d. the information owner verifying the computed acknowledgment, wherein only the information owner can verify the computed acknowledgment.

2. The method of claim 1, wherein said software comprises an applet.

3. A system for allowing a smart card issuer to securely delegate to a third party the download of an applet to a smart card over a network, said system comprising:
   an external device associated with said third party and having said applet resident thereon, said external device capable of transferring said applet to said smart card, wherein said applet is associated with said issuer and said applet is transferred by said third party as delegated by said issuer, said information device capable of downloading new instructions, update existing instructions, and overwriting existing instructions;
   said smart card includes instructions configured to initiate a public-key acknowledgement process that produces a digital signature responsive to successful transfer of said applet and utilizing a cryptographic key stored on said smart card, and send said digital signature to said issuer for validation by said issuer, wherein only the issuer can validate said acknowledgement.

4. The system of claim 3, wherein said acknowledgment process utilizes a symmetrical DES algorithm based on said cryptographic key.

5. The system of claim 4, wherein said DES algorithm is a triple-DES algorithm.

* * * * *